Feb. 22, 1966     T. L. ALLEN, JR     3,237,092
APPARATUS OF THE FREE PRECESSION ATOMIC PORTION TYPE
Filed June 18, 1962     2 Sheets-Sheet 1
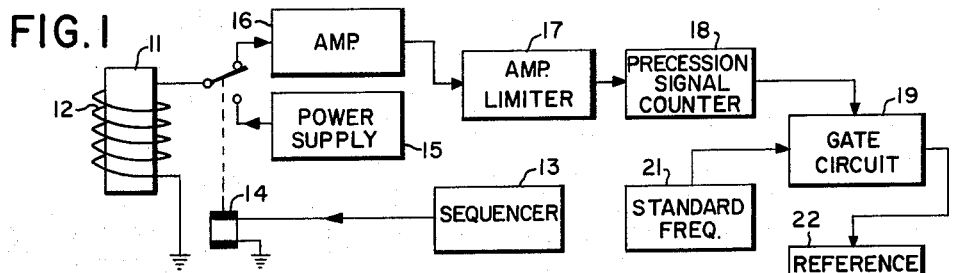
FIG. 1
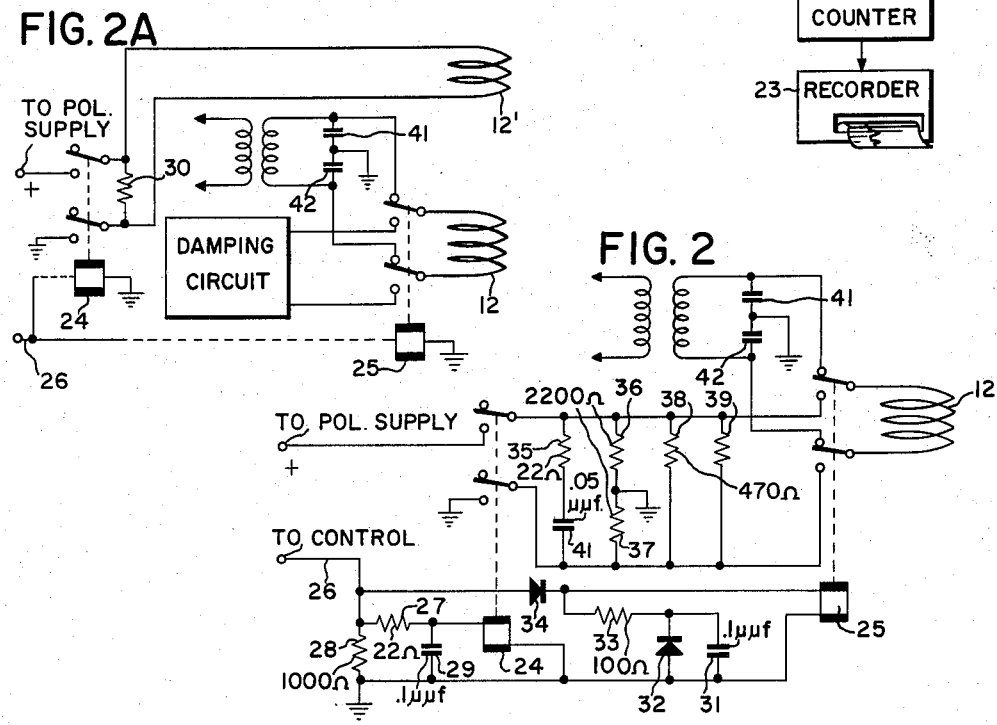
FIG. 2A
FIG. 2
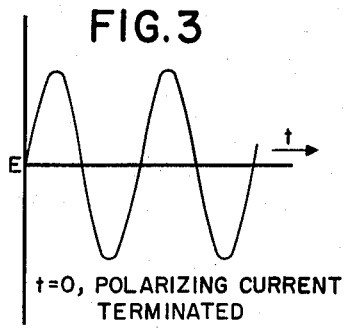
FIG. 3
t=0, POLARIZING CURRENT TERMINATED
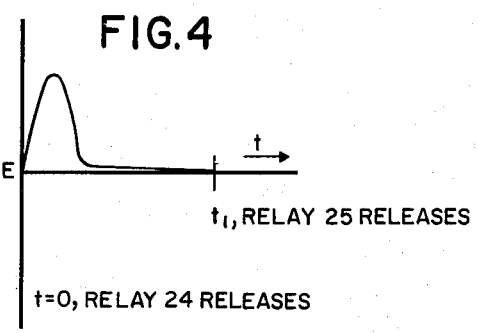
FIG. 4
$t_1$, RELAY 25 RELEASES
t=0, RELAY 24 RELEASES
INVENTOR.
THEODORE L. ALLEN JR.
BY
ATTORNEY Feb. 22, 1966 T. L. ALLEN, JR 3,237,092
APPARATUS OF THE FREE PRECESSION ATOMIC PORTION TYPE
Filed June 18, 1962 2 Sheets-Sheet 2
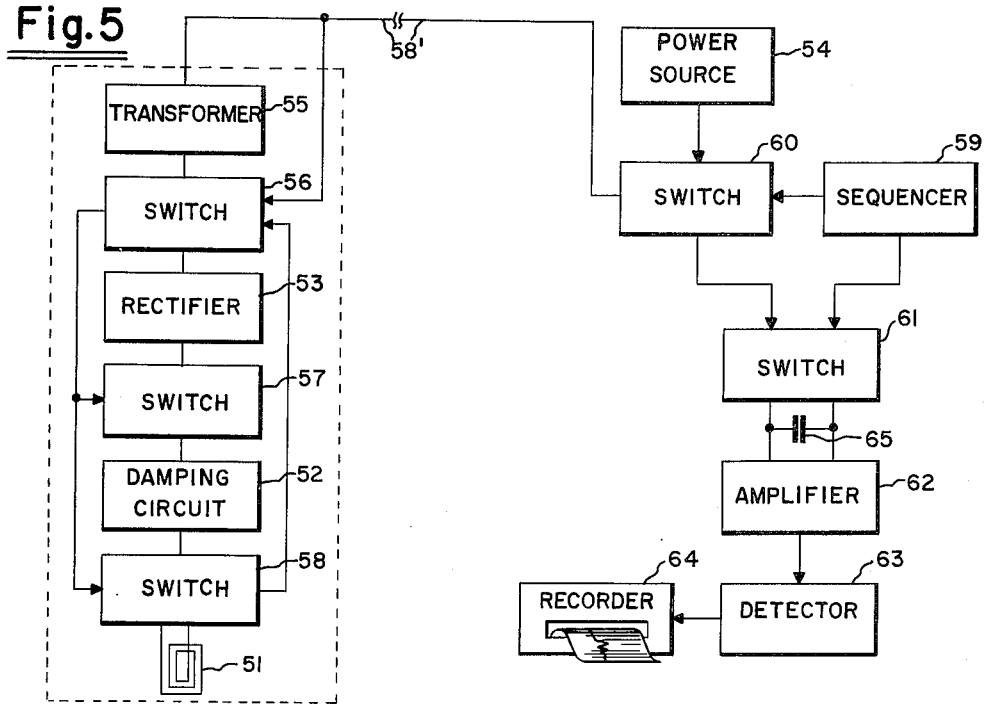
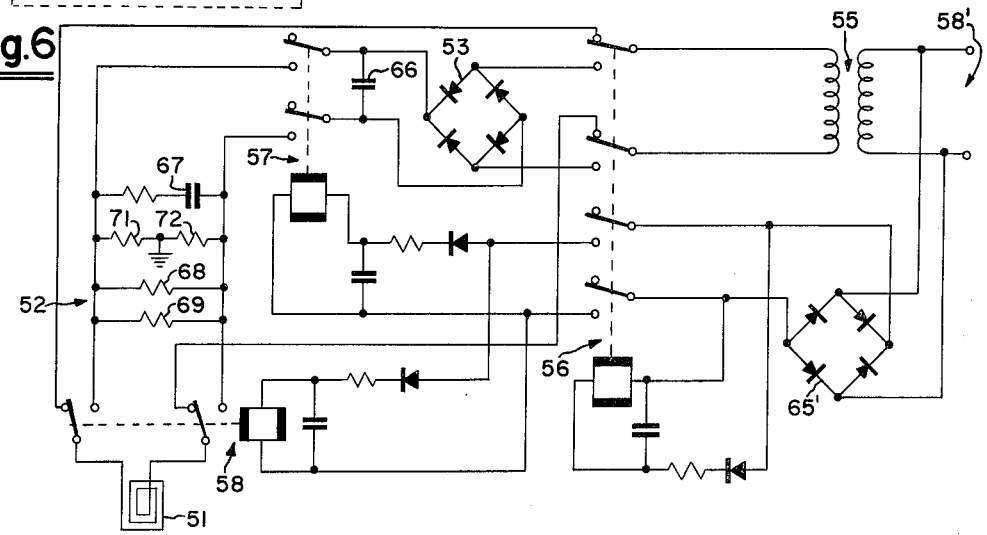
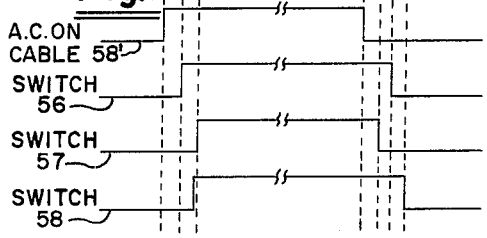
INVENTOR.
THEODORE L. ALLEN JR.
BY
Wm J Nolan
ATTORNEY United States Patent Office 3,237,092
Patented Feb. 22, 1966

3,237,092
APPARATUS OF THE FREE PRECESSION
ATOMIC PORTION TYPE
Theodore L. Allen, Jr., Los Altos, Calif., assignor to Varian Associates, Palo Alto, Calif., a corporation of California
Filed June 18, 1962, Ser. No. 203,389
17 Claims. (Cl. 324—.5)

This application is a continuation-in-part of application Serial No. 695,703, filed November 12, 1957, by Theodore L. Allen, Jr., and now abandoned.

This invention relates in general to atomic precession apparatus and more particularly to novel improvements in apparatus which utilizes the principle of free precession of atom portions such as nuclei in magnetic fields.

The technique of atomic free precession utilized, for example, in measuring magnetic field strengths by means of the precession of atom portions possessing the properties of magnetic moment and gyroscopic moment, such as nuclei, is first explained in U.S. Patent Re. 23,769 issued to Russell H. Varian on January 12, 1954 entitled "Method and Means for Correlating Nuclear Properties of Atoms and Magnetic Fields." In a nuclear free precession magnetometer of present design the nuclei utilized are protons in a sample of water or kerosene, for example. The sensing head which includes the sample is placed in the magnetic field which one desires to measure, for example, the earth's magnetic field, and a strong polarizing magnetic field $H_0$ is applied to the protons by means of a coil surrounding the sample material to polarize the proton magnetic moments $M_0$ substantially at right angles to the earth's magnetic field. This polarizing magnetic field is applied sufficiently long to align the nuclear magnetic moments, for example, three seconds and is suddenly turned off with the result that the nuclear magnetic moments are left substantially perpendicular or at least at some substantial angle relative to the direction of the earth's magnetic field and are free to precess about the direction of the earth's magnetic field at the Larmor frequency of the nuclei. This Larmor frequency is given by the equation $\omega = \gamma_p X H$ where H is the earth's field strength and $\gamma_p$ is a constant referred to as the gyromagnetic ratio of the nuclei. Since the gyromagnetic ratio is a fixed constant, the frequency of the precession is directly proportional to the strength of the earth's magnetic field.

The precessing magnetic moments induce a voltage in a pick-up coil surrounding the sample, in some cases a separate pick-up coil positioned approximately at right angles to the earth's field and to the polarizing field but in most instances of use the same coil that was used for polarizing. The frequency of the detected signal is accurately measured and, in accordance with the above equation, the magnitude of the earth's magnetic field determined. Using protons, the Larmor frequency corresponding to the earth's magnetic field (.5 gauss) is about 2 kilocycles. The system is highly accurate because the precession or Larmor frequency depends only on the strength of the earth's magnetic field and the constant $\gamma_p$. The protons in water $\gamma_p$ have been measured to an absolute accuracy of about 1 in 40 thousand. Relative measurements can be even more accurate and will be limited only by the fundamental conditions of the apparatus.

In most instances of use a single coil is utilized in the magnetometer sensing head for the purpose of both polarizing the protons with a strong polarizing magnetic field and subsequently detecting the precession of the proton magnetic moments in the earth's magnetic field after the polarizing field has been removed. To accomplish this, the polarizing coil is switched back and forth between the polarizing current power supply and the receiver and counter system. It has been found that when the coil is switched directly from the polarizing source to the receiver, transient voltages induced in the coil due to the collapsing polarizing magnetic field produce bursts of noise in the amplifier and subsequent electronic circuits in the receiver and counting system. These bursts at times block the amplifier stages in the receiver and counting system and also cause a prolonged resonance ringing of the high Q circuits located therein and thus tend to mask the free precession signal induced in the sensing coil.

The above described free precession technique is also presently employed in the logging of well bores. A coil is moved along the bore and readings are taken of the signals induced in the coil by the free precessions in the earth's magnetic field of nuclei in the bore material after the nuclei are first polarized at an angle to the earth's field by a strong polarizing pulse of unidirectional magnetic field applied via said coil. Such a well logging instrument is described and claimed in U.S. Patent application Serial No. 264,821, filed by R. H. Varian January 3, 1952.

The present invention provides a novel method and apparatus for preventing the transient signals induced in the sensing coil from entering the receiver of such free precession systems. There is provided a novel switching system in which the sensing head coil is first disconnected from the polarizing supply and, after a slight delay in time, is subsequently connected to the receiver circuitry. During this time delay period, the sensing coil is connected to a damping circuit in which any current surges or transients in the coil are damped before the sensing coil is connected to the receiver.

It is, therefore, an object of the present invention to provide a novel method and apparatus for preventing transient voltages induced in the sensing coil of nuclear free precession apparatus on disconnect from the polarizing current source from affecting the receiver circuits of a nuclear free precession instrument.

One feature of the present invention is the provision of a novel method and apparatus for delaying the connection of the sensing coil to the receiver circuit after disconnect from the polarizing source during which time the voltages induced in the sensing head coil may be damped.

Another feature of the present invention is the provision of a novel method and means of the above featured type in which two relays are utilized to connect the sensing coil to the polarizing source, one relay releasing faster than the other to disconnect the polarizing supply from the coil, the other relay subsequently releasing to connect the coil to the receiver circuit, the sensing coil, during the delay between the release of the two relays, being connected to a damping circuit for eliminating transient voltages induced in the coil.

Still another feature of this invention is that in one embodiment the system is converted from an unbalance-to-ground circuit during the polarizing period to a balance-to-ground system during the receiver time.

These and other features and advantages of the present invention will become more apparent upon a perusal of the following specification taken in connection with the drawings wherein, FIG. 1 is a block diagram of a typical nuclear free precession magnetometer system to which the present invention is particularly adapted, FIG. 2 is one embodiment of the present invention disclosing a preferred circuit for switching the sensing head from the polarizing source to a precession counting system, FIG. 2A shows a modification utilizing two coils rather than one, FIG. 3 is a trace showing the transient voltage induced in the sensing head coil due to collapse of the polarizing field on disconnect without damping, FIG. 4 is a trace showing the transient voltage induced in the sensing head coil on disconnect when utilizing the damping circuit of FIG. 2, FIG. 5 is a block diagram of a nuclear free precession well logging instrument embodying the present invention, FIG. 6 is one embodiment of the invention disclosing a preferred switching circuit in the well logging instrument of FIG. 5, and FIG. 7 shows the relay operation times.

Referring now to FIG. 1 there is shown in block diagram a basic nuclear free precision magnetometer system which includes a sensing head adapted to be positioned in the magnetic field to be measured which we will assume to be the earth's magnetic field. The sensing head comprises a sample material such as water sealed in a container 11 and a coil of wire 12 axially wound about the container. Typically, the coil is constructed so as to carry a D.C. current of about 6 amps and produce a polarizing magnetic field of about 100 gauss in the sample to polarize the protons therein. A sequencer 13, which may be an electrical switching system or a mechanical cam device, automatically operates to pulse a relay 14 which, in its operated position, couples the sensing coil 12 to a D.C. power supply 15 and, in its released position, couples the sensing coil 12 to the free precession counting system. The sequencer typically operates to couple the coil 12 to the power supply for approximately 3 seconds and then to the counting circuit for approximately 2 seconds. During the period of time when the coil 12 is connected to the power supply 15, a polarizing magnetic field is produced to align the magnetic moments of the protons in the sample in the direction of the polarizing magnetic field which is at a substantial angle, preferably normal, to the direction of the earth's magnetic field. On disconnect of the coil 12 from the power supply 15, the polarizing field quickly decays and leaves the aligned magnetic moments to precess in the earth's magnetic field. The precessing magnetic moments induce an alternating current in the sensing coil 12, this alternating frequency signal being transmitted to the counting system which comprises an amplifier 16, the output of which is coupled through a pulse-shaping amplitude limiter 17 to a precession signal counter 18 which, in most instances of use, is a binary counter system operating to count a fixed number of cycles of the free precession signal. On initiation of the count of the first cycle by the counter 18, gate circuit 19 operates to close the circuit from a standard frequency source 21 to a reference counter 22. This standard frequency source may be, for example, a 100 kilocycle crystal controlled oscillator and the reference counter a second binary counter chain for counting the cycles from the standard frequency counter. A predetermined number of cycles is counted in the precession signal counter 18, for example, 2,000 cycles, and, in response to the last cycle in this count, the gate circuit 19 is operated to open the circuit from the standard frequency source 21 to the reference counter 22. As the frequency of the free precession signal increases or decreases with magnetic field strength, the time duration of the gate decreases or increases, respectively. The number of cycles from the standard frequency source 21 counted by the counter 22 during the gate period is a precise measurement of the gate time and thus a highly accurate measurement of the frequency of the free precession signal, and thus the earth's magnetic field strength can be accurately determined. At the end of the gate period, a voltage proportional to the number of crystal controlled pulses counted by counter 22 is fed to a graphic recorder 23 or the like where a record is made in field strength readings.

At the moment the sensing coil is disconnected from the polarizing source at the make contacts of relay 14, the D.C. current in the coil ceases and the polarizing magnetic field collapses and induces a voltage in the polarizing coil. This transient voltage masks the free precession signal which also commences on collapse of the polarizing magnetic field.

To illustrate the extent of the transient voltage induced in the coil by collapse of the polarizing field assume that the inductance of the coil is 15 millihenries and the capacitance across the coil is .1 microfarad (capacitance looking into amplifier including stray capacitance). The energy in the coil is defined as $$\frac{Li^2}{2}$$

where L is the coil inductance and $i_{max}=I=$current in the coil causing the polarizing field during polarizing time. This energy must be discharged into the capacitance and results in an energy at the capacitor defined by $$\frac{E^2C}{2}$$

where C is the capacitance and E is the voltage across the capacitor. With an inductance of 15 millihenries, a current of 10 amps and a capacitance of .1 microfarad, the voltage E computed across the capacitor is, roughly, 4,000 volts. Also, this energized $L-C$ resonant circuit tends to oscillate at a frequency which is determined by the value of the coil inductance and said capacitance which, by way of example, may be 4,000 cycles per second. There is shown in FIG. 3 the type of transient oscillating signal which is obtained. It is thus obvious how such a transient high voltage, oscillating signal could completely mask or at least disrupt, in the amplifier 16, the proton precession signal induced in the coil by the precessing proton magnetic moments which is a 2,000 c.p.s. signal measured in microvolts.

Referring now to FIG. 2 there is shown one embodiment of the present invention in which the transient voltages induced in the coil by the collapsing polarizing magnetic field are completely damped before the coil is coupled to the frequency counting circuit so that an undisturbed count of the precession frequency may be obtained. The switching control circuit for the sensing head coil 12 comprises a pair of relays 24 and 25 coupled to the lead 26 from the control or sequencer unit to which a positive voltage is alternately connected and removed. The positive voltage on lead 26 operates relays 24 and 25 simultaneously which, at their make contacts, connect the sensing head coil 12 through to the polarizing current supply source 15. After the appropriate polarizing time period the sequencer unit removes the positive voltage from lead 26 thus opening the circuit to relays 24 and 25. The release time of these relays is determined by the discharge circuits connected across the respective relays through which the energy induced in the relays due to the collapsing magnetic field may be discharged. In the case of relay 24 the discharge circuit includes resistors 27 and 28 and condenser 29 and the discharge circuit across relay 25 includes the condenser 31 in parallel with the rectifier 32 both in series with resistor 33. The time constant of the discharge circuit for relay 25 is longer than the time constant for relay 24 and thus relay 25 is slower to release than relay 24. Rectifier 34 is incorporated in the circuit to prevent the damping circuit of relay 25 from effecting the release time of relay 24 and, in effect, isolates relay 25 from relay 24 during the release period of these relays.

On release of relay 24 the circuit is open from the polarizing supply 15 to the sensing head coil 12. A certain amount of energy induced in the coil 12 due to the collapsing polarizing magnetic field is dissipated in an arc or discharge across the make contacts of relay 24 on opening. The substantial remaining energy in the sensing coil 12 is dissipated in the impedance circuit including resistors 35 through 39 and condenser 41 which are connected in parallel with the sensing head coil 12 until the release of relay 25. The resistors 35 through 39 and condenser 41 are chosen to give critical damping or more than critical damping at the oscillating frequency of this sensing coil discharge circuit so that the energy in the sensing coil 12 is dissipated in less than 1 cycle of the oscillation frequency. This dissipation of the energy occurs during the period after relay 24 releases and before relay 25 releases and thus, when relay 25 releases to connect the sensing head coil 12 with the amplifier and counting circuitry, the transient voltage induced in the sensing coil 12 by the collapsing magnetic field has been reduced substantially to zero. FIG. 4 illustrates the manner in which the transient voltage signal is damped.

For illustrative purposes, the circuit values for typical switching and damping circuits have been shown in FIG. 2 with the exception of resistance 39 which is chosen in test. It is apparent to those skilled in the art that other equivalent circuit arrangements could be utilized to accomplish this same result. It is also obvious that the present invention is applicable to systems which may use separate coils for the polarizing function and the precession detection function. In such a two coil system, the precession detecting coil will be coupled to the damping circuit during the period the polarizing magnetic field is collapsing and will be switched to the receiver and counting circuit after the transient voltages induced in the precession sensing coil have been damped.

Such a modification to the system of FIGS. 1 and 2 is shown in FIG. 2A wherein operation of relay 24 closes polarizing currents to a separate polarizing coil 12' rather than to the coil 12. This coil 12' may be aligned with or at an angle to the sensing or pick-up coil 12. On release of relay 24, the coil 12 remains coupled to the damping circuit comprising elements 35–39 via the make contacts of relay 25 until the polarizing field completely collapses after which relay 25 releases and closes the sensing coil 12 through to the receiver circuitry. A nonlinear damping resistor 30 may be connected across the coil 12' to prevent excessive voltage across the relay contacts, if desired. A condenser may also be placed across the resistor 30 for suppression purposes.

It is noted that in the embodiment of FIG. 2 the sensing coil circuit is unbalanced-to-ground during polarizing since one end of the coil is grounded at the make contact of relay 24. It is desirable to have the receiver circuit balanced-to-ground so that any external voltages induced in the input leads from the sensing coil to the amplifier will be mutually cancelled. This is particularly desirable when the sensing coil is at a long distance from the amplifier as in the case of well logging instrumentation. The system is converted to a balanced-to-ground system in the damping circuit. The mid-point of the two identical resistors 36 and 37 is connected to ground. The receiver circuit is balanced-to-ground, the point between condensers 41 and 42 being grounded.

It should also be noted that the two-relay switching system of the present invention provides a higher resistance leakage path between the polarizing supply and the sensing coil than single relay switching since the circuit is open at two relay contact sets rather than one set. A higher leakage resistance prevents stray D.C. currents in the coil which could cause small measurement inaccuracies due to the magnetic field they would set up. These magnetic fields would add vectorially to the field being measured and would also cause field inhomogeneities.

Referring now to FIGS. 5 and 6, there is shown a well logging embodiment of the present invention. Reference numeral 51 designates a coil adapted to be lowered into a well bore which serves the double purpose of applying a strong magnetic field to the material in the well formation, to produce nuclear polarization of the same, and picking up the signal produced by atomic nuclei precessing in the earth's magnetic field after removal of the polarizing field. A damping circuit 52 is coupled to the coil 51 through switch 58. A rectifier 53 is utilized to rectify A.C., supplied from power source 54 above ground into D.C. for use by coil 51, so that said coil may produce a steady magnetic field at an angle to the earth's magnetic field. Transformer 55 serves the double purpose of stepping down the A.C. power supplied from above ground before application to rectifier 53, and of stepping up the weak nuclear induction voltage signals so that said signals may be transmitted to the sensitive detecting apparatus located above ground. Switches 56, 57, and 58 are employed for switching rectifiers 53 and damping circuit 52 in and out of the circuit to coil 51, depending on whether or not coil 51 is being used for producing a polarizing D.C. magnetic field or for picking up the nuclear precession signals as subsequently described. The operation of switches 56, 57, and 58 is controlled by the presence or absence of A.C. supply voltage on transformer 55; said operation will be discussed in a later part of this specification.

The parts of the apparatus heretofore described, except power supply 54, are designed to be lowered into the well hole. They are suspended by cable 58' which also provides electrical conduits for supplying A.C. power to components within the well and for transmitting nuclear precession signals picked up by same to the surface. The remainder of the apparatus may be located above ground. Said apparatus comprises power source 54, which supplies A.C. power to the entire system, sequencer 5, which determines the time sequence of switching events, switches 60 and 61, amplifier 62, detector 63, and recorder 64.

The operation of this embodiment of the present invention is as follows. The sequencer 59 is arranged to operate switch 60 in a pulsed manner to alternately connect and disconnect cable 58' and power source 54, said connection lasting for a specified time, for example, three to six seconds. During each pulse of A.C. on cable 58', switches 56, 57 and 58 operate so as to connect coil 51 to the power source 54 via damping circuit 52, rectifier 53 and transformer 55. Coil 51 thus produces a steady polarizing magnetic field in the sample, i.e., the earth and material surrounding the coil in the well. On disconnect of cable 58' from power source 54, the polarizing magnetic field is removed and also switches 56, 57 and 58 act in such a way as to disconnect coil 51 from the rectifier 53 and leave it connected for a short time to the damping circuit 52 via switch 58. The transient surge is damped and then switch 58 operates to connect coil 51 directly to transformer 55 through switch 56 so the free precession signal may be sent to the surface. Thus coil 51 can transmit nuclear free precession signals to the surface via transformer 55 and cable 58' after each successive polarization pulse. After sufficient time has elapsed to allow the switching operation of switches 56 and 57 to take place, sequencer 59 operates switch 61 so as to connect cable 58' through switch 60 to amplifier 62. A condenser 65 shunted across the input of amplifier 62 forms a tuned circuit comprising said condenser, transformer 55 and coil 51. Said tuned circuit is tuned approximately to the frequency of the precessions picked up by coil 51. The successive nuclear induction signals produced in coil 51 are thus impressed on amplifier 62, and the amplifier signals are impressed on detector 63, which rectifies the alternating component of the signals and leaves only the exponentially decaying envelope. Each successive envelope signal is impressed on a suitable recorder means 64 which is referenced to the depth of the well in any well known manner.

Thus it is clear that the device herein described polarizes the nuclei in the well bore in a series of pulses as the coil moves along the well bore, turns the polarizing field off after each pulse, then detects the free precession of the nuclei in the sample in the earth's magnetic field after each polarization, and records the successive free precession signals as a function of the depth. From the recorded signals, the presence or absence of oil or the like may be determined.

A circuit diagram of the electrical apparatus of FIG. 5 which goes down in the well is shown in detail in FIG. 6. Owing to the fact that this apparatus is partially isolated from its power supply, thermionic elements are preferably not used and only simple mechanical relays and dry rectifiers are employed. When A.C. power is supplied on cable 58', D.C. switch 56 is actuated, through rectifier 65', so that the blades thereof engage their associated contacts. Operation of this relay switches the output terminals of transformer 55 to the rectifier 53 and also switches the output of rectifier 65' through to the relay coils of switches 57 and 58. By proper adjustment of the input filters to these two relays and/or through the proper selection of the types of relays used, the operation times of these relays can be adjusted so that relay 58 will operate a few milliseconds before relay 57 as indicated in FIG. 7 and both relays will operate in the order of 10 milliseconds after the operation of relay 56. With this sequence of operations, relay 58 is not required to break the A.C. current flowing through the coil 51 just prior to the operation of relay 56 nor is it required to make the heavy D.C. current which will flow through coil 51 as soon as relay 57 operates. The circuit from the cable 58' can thus be traced through transformer 55 through make contacts of switch 56, through rectifier 53, make contacts of switch 57, make contact of switch 58 to the coil 51 during the polarizing period.

The turn-off procedure is initiated when the A.C. power on cable 58' is removed by the switch 60 at the surface. The D.C. output of rectifier 65' collapses and relays 56, 57 and 58 are free to release according to the restrictions of the damping circuits connected to these relay coils. The diodes in series with the relay coils act to isolate the damping characteristics of one coil from affecting those of the other coils. The relay damping circuits are adjusted so that relay 57 releases first, followed by relay 56 and then by relay 58. The timing on this sequence of releases is shown in FIG. 7. When relay 57 releases it disconnects the D.C. power or the charge stored in capacitor 66 from coil 51. At this point the coil 51 is still connected through the make contacts of switch 58 to the damping circuit 52 which operates as described above with reference to FIG. 2 to damp the transient signal surge from the coil 51. In general, this damping circuit insures that the peak transient voltage, developed by the collapse of the current in coil 51, is held to a reasonable value through the use of the capacitor 67 and also the circuit consisting of coil 51 and damping circuit 52 is adjusted to near critical damping through the proper choice of resistors 68 and 69. The resistors 71 and 72 serve to balance the circuits to ground during the period following the release of relay 57. The requirements for the timing of the release of relay 58 are described above. The only requirement on the release of relay 56 is that it should release prior to the release of relay 58 in order that the maximum signal time may be achieved. The charge available for continuing the current in coil 1, after the termination of the A.C. power, is for the most part contained in capacitor 66. This capacitor therefore should be of such size that a reasonable level of current can be maintained for 15 to 20 milliseconds after the termination of the A.C. power in order that relay 57 has time to operate before the current level becomes so low that desired damping action of the damping circuit 52 cannot be realized after the release of relay 57. A 10 to 1 reduction in coil current during this 15 to 20 milliseconds is a reasonable figure.

As with the system of FIGS. 1 and 2 above, this well logging instrument may utilize a separate coil for polarizing, the coil 51 serving only to pick up the free precession signal. Relay 58 would serve to keep the damping circuit coupled to coil 51 during the decay time of the polarizing magnetic field. This modification would be similar to that shown in FIG. 2A.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for use in a magnetometer of the atomic free precession type in which atom portions in a sample of matter are first polarized by a pulse of strong magnetic field and then precess in the field to be measured and induce a field dependent signal in a sensing coil adapted to be coupled to a suitable receiver, comprising a damping circuit, and means for electrically connecting said sensing coil to said damping circuit to damp any transient signals induced in said sensing coil on collapse of said polarizing magnetic field and for subsequently electrically switching said sensing coil to the receiver circuit of said magnetometer, said last means comprising a two-state switch which in one state electrically connects the sensing coil to said damping circuit and in another state electrically disconnects the damping circuit from the sensing coil and electrically connects the sensing coil to said receiver circuit.

2. Apparatus as claimed in claim 1 wherein said magnetometer is a nuclear free precession magnetometer, said atom portions being nuclei.

3. Apparatus for use in a magnetometer of the atomic free precession type in which atom portions in a sample of matter are first polarized by a pulse of strong magnetic field and then precess in the field to be measured and induce a field dependent signal in a sensing coil for transmission to a suitable receiver, comprising a sensing coil for producing a polarizing magnetic field and for subsequently detecting the atomic free precessions, a polarizing supply for providing suitable polarizing current to said sensing coil, a damping circuit for discharging any transient signals induced in said sensing coil on collapse of said polarizing magnetic field, first circuit means for electrically coupling said sensing coil and said damping circuit to said polarizing source, and for subsequently electrically disconnecting said coil and said damping circuit from said polarizing source, and second circuit means for subsequently electrically decoupling said sensing coil from said damping circuit and electrically coupling it to said receiver for receiving the free precession signal.

4. Apparatus as claimed in claim 3 wherein said magnetometer is a nuclear free precession magnetometer, said atom portions being nuclei.

5. Apparatus as claimed in claim 3 wherein said two circuit means comprises a pair of relays operable in parallel from a control source.

6. Apparatus as claimed in claim 3 wherein said first and second circuit means comprises first and second switching means, and means for operating both said first and second switching means to electrically couple said sensing coil through said damping circuit to said polarizing current source whereby polarizing current flows through said sensing coil, said last means subsequently operating said first switching means to electrically decouple said coil from said polarizing supply, said coil discharging through said damping circuit, said last means subsequently operating said second switching means to electrically switch said sensing coil from said damping circuit to said receiver.

7. Apparatus as claimed in claim 6 wherein said first and second switching means comprise first and second relays respectively, said relays connected for operation in parallel to couple the sensing coil to the polarizing supply, said second relay being slower-to-release than said first relay, said sensing coil being discharged through said damping circuit during the period after said first relay releases and before said second relay releases.

8. Apparatus as claimed in claim 7 wherein rectifier means is coupled between said parallel connected relays which effectively decouples the relays during the release time so that the time constants of the relays are independent.

9. Apparatus for use in a magnetometer of the atomic free precession type in which atom portions in a sample of matter are first polarized by a pulse of strong magnetic field and then precess in the field to be measured and produce a field dependent signal comprising a sensing coil for producing a polarizing magnetic field and for subsequently detecting the atomic free precession field dependent signal, a polarizing supply for providing suitable polarizing current to said sensing coil, a receiver circuit for receiving the field dependent signal, switching means for electrically coupling said sensing coil to said polarizing source, one side of said coil being closer to ground potential than the other such that the circuit between said polarizing supply and said sensing coil is unbalanced-to-ground, said switching means operable to electrically switch said sensing coil from said polarizing supply to said receiver circuit for receiving the free precession signal, and circuit means between said sensing coil and said receiver means operative to provide that one side of said sensing coil, when connected to said receiver circuit, is as close to ground potential as the other side whereby the circuit between said sensing coil and said receiver is balanced-to-ground.

10. Apparatus as claimed in claim 9 including a damping circuit electrically coupled to said switching means for discharging any transient signals induced in said sensing coil on collapse of said polarizing magnetic field, said switching means electrically coupling said damping circuit to said sensing coil during the period after electrically disconnect from said polarizing supply and before electrically connecting to said receiver circuit, said damping circuit being balanced-to-ground.

11. Apparatus of the atomic free precession type in which atom portions in a sample of matter are first polarized by a pulse of strong magnetic field and then precess in another magnetic field and produce a signal in a sensing coil adapted to be coupled to a suitable receiver, comprising a damping circuit, and means for electrically connecting said sensing coil to said damping circuit to damp any transient signals induced in said sensing coil on collapse of said polarizing magnetic field and for subsequently electrically switching said sensing coil to the receiver circuit, said last means comprising a two-state switch which in one state electrically connects the sensing coil to said damping circuit and in another state electrically disconnects the damping circuit from the sensing coil and electrically connects the sensing coil to said receiver circuit.

12. Apparatus as claimed in claim 11 wherein said atom portions comprise nuclei.

13. Apparatus of the atomic free precession type in which atom portions in a sample of matter are first polarized by a pulse of strong magnetic field and then precess in another magnetic field and produce a signal in a sensing coil for transmission to a suitable receiver, comprising a sensing coil for producing a polarizing magnetic field and for subsequently detecting the atomic free precessions, a polarizing supply for providing suitable polarizing current to said sensing coil, a damping circuit for discharging any transient signals induced in said sensing coil on collapse of said polarizing magnetic field, first circuit means for electrically coupling said sensing coil and said damping circuit to said polarizing source and for subsequently electrically disconnecting said coil and said damping circuit from said polarizing source, and second circuit means for subsequently electrically decoupling said sensing coil from said damping circuit and electrically coupling said coil to said receiver for receiving the free precession signal.

14. Apparatus as claimed in claim 13 wherein said atom portions comprise nuclei.

15. Apparatus as claimed in claim 13 wherein said first and second circuit means comprises first and second switching means, and means for operating both said first and second switching means to electrically couple said sensing coil through said damping circuit to said polarizing current source whereby polarizing current flows through said sensing coil, said last means subsequently operating said first switching means to electrically decouple said coil from said polarizing supply, said coil discharging through said damping circuit, said last means subsequently operating said second switching means to electrically switch said sensing coil from said damping circuit to said receiver.

16. Apparatus for use in a system of the atomic free precession type in which atom portions in a sample of matter are first polarized by a pulse of strong magnetic field and then precess in another magnetic field and produce a signal comprising a sensing coil for producing a polarizing magnetic field and for subsequently detecting the atomic free precession signal, a polarizing supply for providing suitable polarizing current to said sensing coil, a receiver circuit for receiving the free precession signal, switching means for electrically coupling said sensing coil to said polarizing source, one side of said coil being closer to ground potential than the other such that the circuit between said polarizing supply and said sensing coil is unbalanced-to-ground, said switching means operable to electrically switch said sensing coil from said polarizing supply to said receiver circuit for receiving the free precession signals, and circuit means between said sensing coil and said receiver means operative to provide that one side of said sensing coil, when connected to said receiver circuit, is as close to ground potential as the other side whereby the circuit between said sensing coil and said receiver is balanced-to-ground.

17. Apparatus as claimed in claim 16 wherein said atom portions comprise nuclei.

References Cited by the Examiner

UNITED STATES PATENTS 3,042,855   7/1962   Brown _____ 324—0.5

FOREIGN PATENTS 1,236,724   6/1960   France.

OTHER REFERENCES

German application 1,015,954, printed Sept. 19, 1957 (KL21g).

Klose: Zeitschrift fur Angewandte Physic, vol. 10, No. 11, January 1958, pp. 495–497.

LEWIS H. MYERS, *Primary Examiner.*

CHESTER L. JUSTUS, MAYNARD R. WILBUR,
*Examiners.*